FIG. 1

INVENTORS:
CHARLES OVID BAKER
WARREN B. BROOKS
EUGENE L. JONES

*Alan G. Paul*
ATTORNEY

July 14, 1970 — W. B. BROOKS ET AL — 3,520,358

SUBSEA PRODUCTION SYSTEM

Filed June 29, 1967 — 4 Sheets-Sheet 2

FIG. 2

INVENTORS:
CHARLES OVID BAKER
WARREN B. BROOKS
EUGENE L. JONES

Alan G. Paul
ATTORNEY

July 14, 1970  W. B. BROOKS ET AL  3,520,358

SUBSEA PRODUCTION SYSTEM

Filed June 29, 1967  4 Sheets-Sheet 4

FIG. 4

INVENTORS
CHARLES OVID BAKER
WARREN B. BROOKS
EUGENE G. JONES

Alan G. Paul

ATTORNEY

United States Patent Office 3,520,358
Patented July 14, 1970

1

3,520,358
SUBSEA PRODUCTION SYSTEM
Warren B. Brooks, New York, N.Y., and Charles Ovid Baker, Garland, and Eugene L. Jones, Dallas, Tex., assignors to Mobil Oil Corporation, a corporation of New York
Filed June 29, 1967, Ser. No. 649,959
Int. Cl. E21b 33/035; E21c 19/00
U.S. Cl. 166—.5      43 Claims

ABSTRACT OF THE DISCLOSURE

This specification discloses a subsea system for the production of fluid minerals. The system includes a product gathering network provided with production satellites in which the gas-oil-water ratios of each well are periodically tested and the flow rates are automatically controlled. A power distribution network connects a central power station, either floating or bottom supported, at the site or on land nearby, with the various satellite stations and submerged wellhead units. Provision is made for entry into the satellites and diver maintenance at the submerged wellheads. Also, as a part of this subsea system, is a remotely controlled wireline unit. Submersible vehicles function as underwater rest stations for divers working on the subsea equipment as well as conveyances for transporting divers and nondiving personnel to the satellites and wellhead units. General purpose submersible vehicles with articulated manipulators, as well as specialized robot submersibles such as pipe welders and wireline units, permit diverless installation of equipment as well as maintenance and control of the installed equipment.

BACKGROUND OF THE INVENTION

Field of the invention

This invention relates to a subsea system for the recovery of subaqueous deposits of fluid minerals. By the term "fluid" is meant any slurry or other state of matter which will pass through a conduit or pipe. More particularly, the invention relates to the production of gas and/or oil from subaqueous formations utilizing a system of submerged wellheads and a product gathering network in combination with submersible automated and/or semi-automated equipment.

DESCRIPTION OF THE PRIOR ART

Present developments in the offshore oil and gas industry indicate that production efforts will be extended, in the near future, to undersea areas, such as the outer fringes of the continental shelves and the continental slopes, where a submarine production system is believed to be the most practical method of reaching the subaqueous deposits. Although hydrocarbons are the main concern at this time, it is contemplated that subaqueous deposits of sulfur and other minerals will be produced from beneath the seas in a very few years. While bottom-supported permanent surface installations have proved to be economically and technologically feasible in comparatively shallow waters, it is believed that in the deeper waters of the continental shelves (over three hundred feet) and the continental slopes (depths over six hundred feet), the utilization of such surface installations must be limited to very special situations. Installations extending above the water surface are also disadvantageous even in shallower water where there are adverse surface conditions, such as in the Arctic areas where the bottom-supported structure of above-surface production platforms are subject to ice loading. The tides, which may run up to thirty feet in the northern latitudes, such as in Cook Inlet, Alaska, tend to lift the ice formed on the legs of the platform and tear the anchoring means therefor completely out of the sea bottom as well as driving broken-up sheet ice laterally against the platforms at six to eight knots or more. In some areas commercial shipping and pleasure boats present a constant source of danger to above-surface installations, while recreation and area beautification may provide man-made obstacles to their erection, particularly near seaside resort areas and seaport cities.

The sheltering of production equipment beneath the surface of the sea, while believed to be economically feasible at depths of over three hundred feet, even where adverse conditions are not present, still presents many technical problems, particularly with respect to the servicing and maintenance thereof. With a deep water subsea system, the majority of the maintenance and servicing problems encountered must be handled automatically, or at least by remote control, due to the cost and limitations on deep diving at the present time; however, there should be provisions for having divers at the scene of installed subsea equipment in the event that the necessary manipulations are too complicated for anything but direct human control. The use of submersible vehicles, with articulated manipulators, for performing a variety of subsea operations has been generally proven and such vehicles can fill much of the gap between completely automated equipment and operations that must be performed by divers.

Robots, such as those shown in the Johnson U.S. Pat. No. 3,099,316, issued July 30, 1963, the Shatto U.S. Pat. No. 3,165,899, issued Jan. 19, 1965, and the Shatto, Jr., U.S. Pat. No. 3,163,221, issued Dec. 29, 1964, have been developed for the most part for working on subsea wellheads, in conjunction with guide rails or other engaging and guiding devices built on the wellheads, as shown. The Haeber U.S. Pat. No. 3,261,398, issued July 19, 1966, does show, in a general way, the use of a track for guiding a robot through a bottom-mounted array of production equipment. The use of a drill string, extending from a surface vessel, also has been contemplated for actuating the controls of subsea equipment ("Drill Pipe Becomes Long-Handled Underwater Socket Wrench"—The Oil & Gas Journal, Jan. 24, 1966, pages 90–93). The Popich U.S. Pat. No. 3,103,790, issued Sept. 17, 1963, shows a pipe trenching robot while the Shell British Pat. No. 1,021,264 discloses a bottom traversing, general-purpose robot. The robots of both of these last two patents recited are designed to be controlled from a surface mother ship. However, no overall integrated design has been disclosed in the prior art for handling the installation, repair, and maintenance of a deep water subsea production system. For instance, there is no equipment known for performing wireline operations completely under water. The Ashe et al. U.S. Pat. No. 3,041,090 is illustrative of the prior art, disclosing a foldable lubricator adapted to extend all the way from a submerged wellhead to the surface of the body of water where the wireline operations are conducted from a surface ship.

The use of a pressurized traveling chamber for transporting divers from the ocean bottom to a chamber aboard a surface ship is disclosed in the article entitled "Diving-Chamber Complex Speeds Subsea Salvage Job," The Oil & Gas Journal, June 20, 1966, pages 82 and 83. However, the utilization of a submersible, self-propelled, vehicle as a pressurized, on-site, rest station is not shown in the prior art. The limiting of the use of surface vessels to the transporation of subsea equipment from shore, the lowering of subsea equipment to the marine bottom, and the transporting of collected and stored products, increases the independence of the production system from surface conditions.

SUMMARY OF THE INVENTION

In accordance with this invention, there is provided a subsea production system including satellite gathering stations for testing the produced effluent from submerged wellheads of spaced subaqueous wells whose products are directed therethrough, and in response, controlling the wellhead valves of the respective subaqueous wells. While the satellite stations are designed for automatic and/or remote operation, there are provided means for the safe entry of personnel for maintenance and repair. Furthermore, the satellite stations are each constructed so as to prevent pernicious vapors leaking from the production equipment from contaminating the life support sections of a satellite station.

A power distribution network connects a power generating station with the satellite stations and the wellheads. The power generating station if at the site can be a surface unit of the floating type or it alternatively can be mounted on a bottom-supported platform, depending, for the most part, on the water depth in which the subaqueaus deposits are being produced. Another possibility is that of locating the power generating station ashore and connecting it with the offshore producing field through lines laid across the marine bottom. Preferably the power generating station is submerged along with the rest of the production equipment. By encapsuluating the generating station within a shell, similar to those of the satellite stations, only fresh air and communication lines need be supported at the surface by small buoys.

The main subsea system discussed above also includes a back-up or fail-safe system adapted to manipulate the well-head valves in case of a failure in satellite station-to-wellhead communication and to perform operations not adapted to be automatically controlled from the satellite station. The fail-safe system is provided with submersible vehicles, having articulated manipulators for the remote manual control of the submerged wellhead and flowline valves as well as for the installation of the subsea equipment. The remotely controlled submersible vehicles, controlled from a surface vessel, are complemented by manned submersible vehicles provided with pressurized life support rest chamber sections for divers working on the submerged equipment. A robot unit for welding pipe sections, in conjunction with the submersible vehicles having articulated manipulators, permits the units of the system to be interconnected by flowlines without divers. In very deep water, this becomes almost a necessity.

An integral part of the subsea system of the present invention is a submersible wireline robot unit, lowered from the surface to a submerged wellhead unit and powered either from the surface vessel or at the site of the wellhead unit through the power distribution network. The robot unit can be controlled remotely from the surface or from an adjacent submersible vehicle with a connecting control cable plugged into the robot wireline unit. Particularly where workover operations, such as paraffin cutting, need not be conducted frequently, the robot wireline unit provides a significant saving over the TFL (through the flowline) tool system.

DESCRIPTION OF SPECIFIC EMBODIMENTS

The subsea production system of the present invention has been designed specifically for offshore areas in which the water is too deep for the economical utilization of bottom-supported surface platforms, although it can be advantageously utilized in not so deep water where there are adverse surface conditions. The subsea system has the capability for automatic and/or remotely controlled installation, servicing, and maintenance, and comprises submerged wellheads spaced across a marine bottom and connected to an on-site storage facility through satellite gathering stations fixed on the marine bottom. Each of the satellite gathering stations is provided with multiple chambers capable of being maintained at independently controlled pressures: a central access chamber providing entry or exit of personnel directly into the water or into a submersible vehicle, a production chamber at one end including equipment, i.e., a test separator for providing the necessary information for controlling the gas and/or oil production of the individual wells, and a life support chamber at the other end having the air purification system, pumping equipment and the electrical and electronic facilities for compiling and storing information and for acting on the production test results to control the subaqueous production equipment.

A remotely controlled unit, lowered from a surface vessel directly over a submerged wellhead where wireline procedures are called for, is controlled from a nearby submersible vehicle or from the surface ship and obtains its power from the surface ship or through power distribution lines from a central generating station through the respective satellite gathering station. The wireline operating submersible vehicle is also capable of transporting divers to attend to servicing and/or maintenance problems at the wellhead, the submersible vehicle acting as a pressurized rest station in which a number of divers are held. Due to the very short work time permissible in deep water, perhaps only half an hour, one diver works for his allotted time, returns to the submersible vehicle, and another diver goes out to continue the work.

The submersible vehicles, both manned and remotely controlled, with their articulated manipulators, do more than just act to ferry personnel between a surface vessel and the satellite station, and control robot wireline units. Depending on the job to be performed, a number of different tools connectable to the outer ends of the individual manipulators can be utilized. With submersible vehicles carrying their own supplies of tools, almost any function that could be performed by a man with manual or power operated hand tools can be assigned to them. The submersible vehicles can perform such operations as adjusting valves on the wellheads and flowlines as well as aiding in the installation of the subsea equipment.

Figure 1:
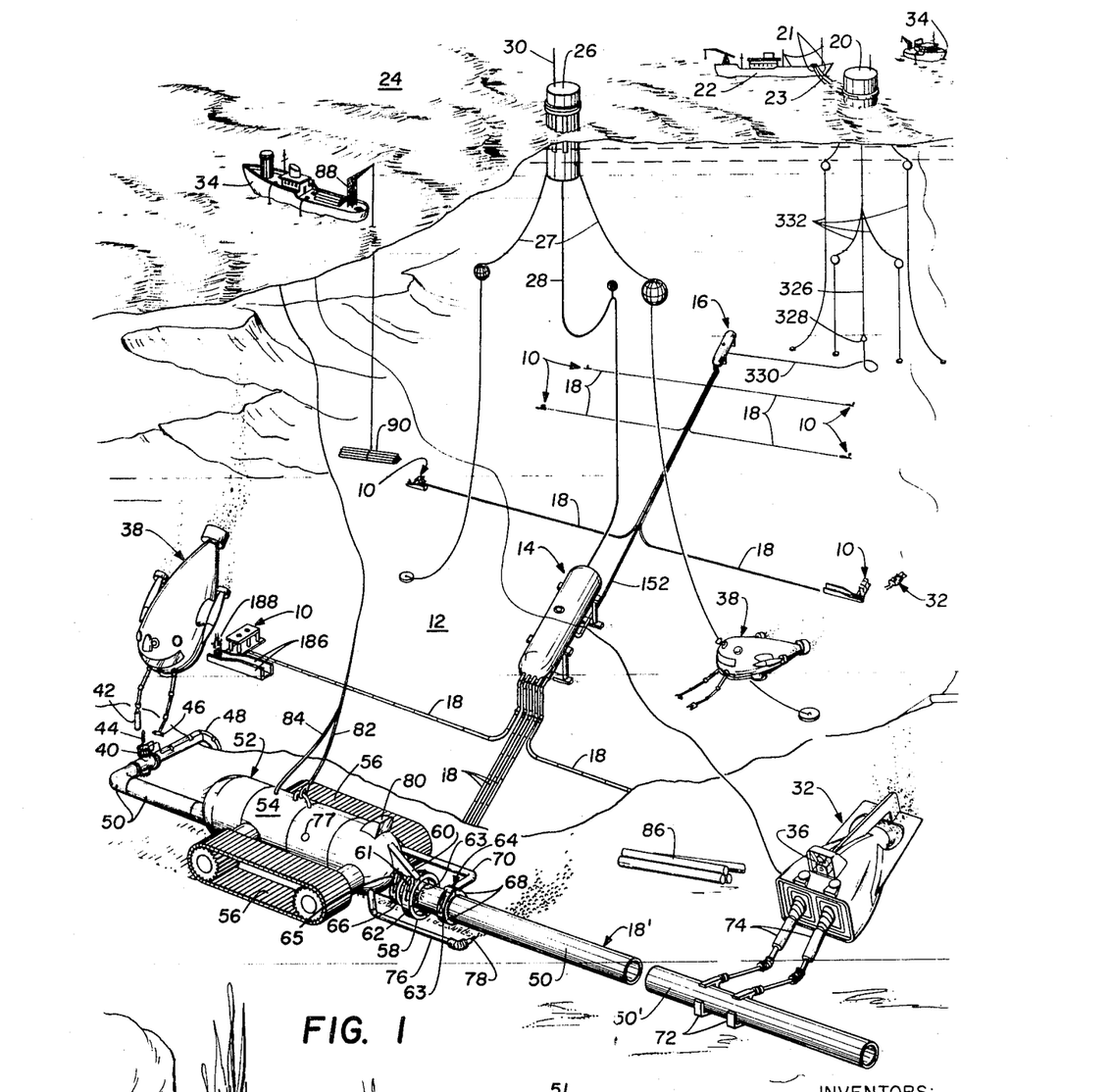
FIG. 1 is a pictorial representation of a portion of a subsea producing system in accordance with this invention.

Now referring to FIG. 1, there is shown a subsea production system in operation in the background and a continuation of the flowlines therefrom being installed on the ocean bottom in the foreground. Submerged production oil and/or gas wellhead units, generally designated 10, on the marine bottom 12 are connected into the subsea system through satellite stations, generally designated 14 and 16, by means of flowlines 18. The satellite station 14 functions as a production gathering point, information center, and automatic control center for its associated wells, while the satellite station 16 provides all the functions of the station 14 while also having added pumping facilities for forcing the produced hydrocarbons up to a floating storage tank 20. The stored hydrocarbons are removed from the floating storage tank 20 by a tanker 22, floating on the water surface 24, which visits the storage tank 20 and is moored thereto at prescribed intervals. As shown, the tanker 22 is located with respect to the storage tank by mooring lines 21 while unloading through a floating hose 23 connected to an outlet of the storage tank 20. A floating central control and power generating station 26 is moored above the subaqueous producing field by lines 27 and is connected to the satellite 14 by a bundle of electrical lines 28 for information input and retrieval, command signals, and the supplying of electrical power to the subsea system. It is contemplated that personnel would live on the station 26 to supervise continuously the operation of the subsea production system. Electric power is distributed, along the marine bottom 12, to the various wellhead units 10 shown, the satellite station 16, and other satellite stations 14 from the illustrated satellite station 14.

Although the central control and power generating station 26 is illustrated as floating on the surface of the body of water just above the subsea production system, depending upon the distance from shore, the floating station 26 could be dispensed with entirely and the electrical power lines as well as the information input and retrieval and command signal lines could be laid across the ocean bottom to an onshore station. Another possibility is that the floating station 26, while having the equipment for generating power built thereon, would be merely a link between the submerged satellite 14 and a station ashore for the transmission of information to and from shore and command signals to the satellite through the illustrated antenna 30. A microwave relay system, of the type now utilized in conjunction with some platform-produced fields in the Gulf of Mexico, would be acceptable for this purpose.

Various valves and controls situated at the well head units 10 would normally be controlled by interconnecting hydraulic or electrical lines from within the satellites 14 and 16. However, if there should be a breakdown in communication between a wellhead unit 10 and its respective controlling satellite 14 or 16, articulated armed robot submersible vehicles, generally designated 32, (the nearer one shown handling pipe), remotely controlled from surface vessels 34, would be utilized. Such vehicles, directed by the aid of remote viewers such as television cameras 36 in clear water, or sonic or laser viewers in murky water, mounted thereon, would be much less expensive than a manned vehicle with its attendant life support systems. However, in instances where direct observation is necessary, submersible vehicles having articulated manipulators, such as the illustrated submersible vehicles, generally designated 38, are useful; the vehicle 38 at the right is observing a pipe-laying operation, while the vehicle 38 at the left is about to operate a flowline valve 40 by the use of a rotary actuator tool 42 adapted to fit an upwardly extending nut 44 forming the valve actuator. A tool, such as the rotary actuator tool 42, as well as a number of other tools to be used in conjunction with the articulated manipulators of submersible vehicles are pictured on pages 653–661 of the book Proceedings of Oecon—Offshore Exploration Conference, 1966, published by M. J. Richardson, Inc., 2516 Via Tejon, Palos Verdes Estates, Calif. The other articulated manipulator terminates in a platelike tool 46 used as a reaction member to prevent the vehicle 38 from turning rather than the valve actuator nut 44. The valve 40 would normally be controlled from a satellite station 14, 16 through the control line 48 strapped thereto. Along the outer shell of the submersible vehicles 38 are pockets or hooks (not shown) for carrying as many different tools as may be necessary. By using one of the many known quick release couplings, an articulated manipulator can easily be released from a first tool connected to the outer end thereof and to a second tool fixed thereon. As will be explained later, a similar manned submersible vehicle can also be utilized as a rest station for divers working at a nearby wellhead unit 10 or other equipment.

Individual wellhead units 10, as well as the satellite stations 14 and 16, can be installed at the proposed location without the need for divers. It is now well within the skill of the art to remotely locate equipment on the marine bottom 12, in the proper orientation, and secure it in place. One of the major problems remaining, however, is that of connecting the individual production units of the subsea system together. As shown in the foreground of FIG. 1, sections of pipe 50 of a flowline 18′, to be connected between the illustrated satellite 14 and a well head unit 10 off to the right of the drawing in the foreground, are being installed on a shelf 51 of the marine bottom 12 by the use of one of the unmanned remotely controlled articulated submersible vehicles 32 and a robot welder, generally designated 52.

The robot welder 52 comprises a tanklike body 54 supported above the path of the flowline 18′, being installed, on a pair of opposed endless treads 56 driven by a motor and transmission means (not shown) within the tank 54. The robot welder 52 would normally be supported on the marine bottom 12 by the treads 56, but in areas where bottom sediments would not support the weight of the robot welder 52, buoyancy chambers would be built into the tanklike body 54.

Extending out ahead of the tank 54 is a welding ring 58 which encircles the flowline 18′ and is held in a vertical position by a strut 60 extending out from the front of the tanklike body 54. A welding head 62 is contained on a track (not shown) around the inside face of the welding ring 58 so that a welding bead is formed which completely encircles a joint 63 between abutting sections of pipe 50. The welding ring 58 is formed of a pair of semicircular members pivoted about the point of connection with the strut 60. A hydraulic piston cylinder 61, connected between a point on each semicircular member of the welding ring 58 and the pivot point to control the opening and closing of the welding ring 58. The ability of the welding ring to open permits the robot welder to mount a flowline 18 intermediate the ends thereof. A pair of aligned pipe clamps 64 and 66 holding the abutting ends of adjacent sections of pipe 50 together and in alignment prior to and during the welding operation. The pipe gripping portion of clamp 64 and a pair of semicircular jaws 68 are actuated by extensible struts having hydraulic piston-cylinder arrangements 63 connected between each of the jaws 68 and an outwardly extending anchoring arm 70 from which the jaws 68 pivot. The jaws of the clamp 66 are pivoted from the underside of the strut under the control of extensible struts 65. With the jaws of the clamps 64 and 66 reopening, the robot welder 52 can move up the flowline 18′ to the next point at which a weld is needed. The closing of the clamp 66 aligns the end of the last pipe section 50 of the flowline 18′ and the welding ring 58. The still opened jaws 68 of the clamp 64 permit the remotely controlled submersible vehicle 32 (in the right foreground) to slide a new pipe section 50′ into the jaws 68 of the clamp 64 by means of the hand or vice-type extension tools 72 at the ends of its articulated manipulators 74. A pile 86 of pipe sections is stacked on the shelf 51 just behind the flowline 18′ being fabricated. When the remotely controlled submersible vehicle 32 delivers a pipe section 50′ that it is carrying, to the robot welder 52, it is sent back to pick up another pipe section 50′ from the pile 86. The vessel 34 from which the remotely controlled submersible vehicle 32 and welder 52 are both controlled has a crane 88 capable of lowering further stacks 90 of pipe sections 50 down to the flowline 18′ being fabricated.

In connecting two of the subsea producing units with a flowline, it is advantageous to use a collet connector (not shown) at each fixed unit since the robot welder 52 is not suited to forming any but abutting welds between pipe sections of substantially equal diameters. To start the flowline, a first pipe section is transported by the submersible vehicle 32 to the fixed producing unit from which the flowline is to be started. The end of a pipe section is inserted into a collet connector forming the outer portion of a port in the unit. The collet connector is actuated to lock the pipe section in place from a central facility, or a surface vessel, or from the submersible vehicle. The robot welder 52 is then lowered onto the pipe section 50', forming the beginning of a flowline with both sets of pipe clamps 64 and 66 as well as the welding ring 58 held open. When the welder 52 has settled down on the unfinished flowline, the welding ring 58 may be closed and is not again opened until the flowline is completed. Sections of pipe are added to the flowline and welded in place as discussed above. As the flowline reaches a point at which it is only one pipe section or less from the second producing unit, a measured pipe section is brought up which will lock in a collet connector terminating a port in the second unit while abutting the last pipe section of the unfinished flowline. The last joint is then welded between the measured pipe section and the unfinished flowline after which the clamps 64 and 66 as well as the welding ring 58 are all opened permitting the robot welder 52 to be lifted off of the pipeline 18'. At this time the collet connector on the second producing unit is actuated to complete the flowline.

Once the pipe section 50' has been inserted into the enlarged opening through the clamp 64 and the new section of pipe 50' abuts tightly against the last welded-on section 50, the jaws 68 of the clamp 64 are closed, aligning the pipe sections 50 and 50' in abutting relationship. The traveling welding head 62 is then driven around the track within the ring 58 to form a circumferential bead around the joint after which both of the clamps 64, 66 are opened. The robot welder 52 then moves on up the flowline to the new outer end of the flowline 18', one pipe section 50 away, and the sequence of operations is repeated. Since the pipe sections 50 tend to sink into the mud on the marine bottom 62, a means must be provided for forming a temporary path under the flowline 18' so as not to hinder the movement of the clamps 64, 66 and the ring 58 as the welder 52 moves forward. A shallow trench is formed ahead of the robot welder 52 by a jet pipe 76 extending out parallel to the flowline 18'. The tip 78 of the jet pipe 76 is aimed to project fluid under pressure transversely toward, and down slightly below, the flowline 18'. The preferred method is to provide a pump (not shown) with the body 54 to pick up sea water through an intake port and drive the water out through the jet pipe 76. A television camera 80 (or any other type of remote viewer as previously discussed) is mounted on top and at the front of the tanklike body 54 of the robot welder 52 so that the welding operations can be observed from the ship 34 (at the left-hand side of the drawing) at the surface. The ship 34 and the robot welder 52 are connected by a hoisting line 82, and a control cable 84 through which the television signals are sent to the ship 34 and commands are transmitted to the welder 52 from the ship. Within the tanklike body 54 is the various equipment for directly controlling the movement of the robot welder 52.

Figure 2:
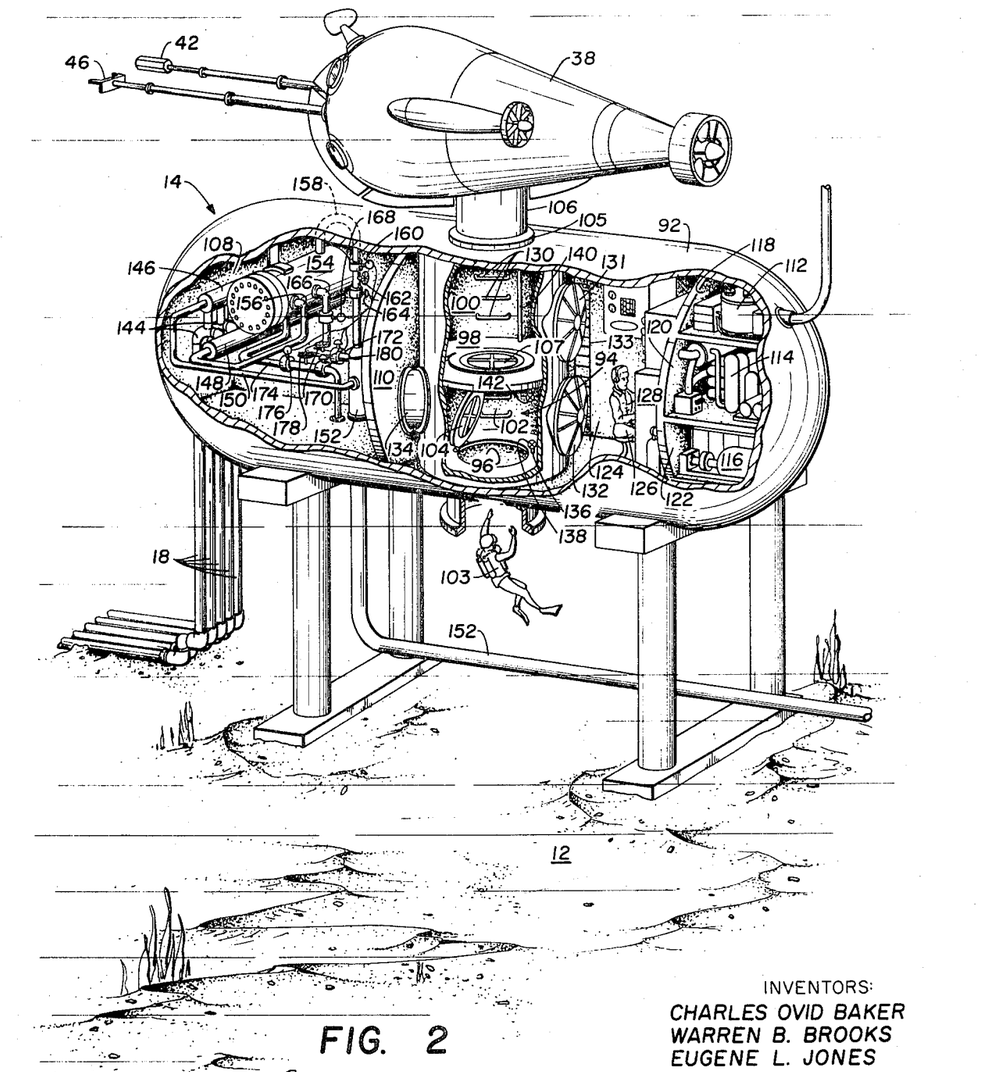
FIG. 2 is an elevational view, partially broken away, of a subsea satellite station forming a portion of the subsea producing system of the present invention.

Now looking to FIG. 2, the satellite station 14 has a hollow shell 92 comprising a cylindrical center section closed by hemispherical end sections and is divided interiorly into three airtight chambers. A central access chamber, generally designated 94, provides an entrance into the satellite station 14 from one of the submersible vehicles 38 from above, or by a diver, through a lock 96 below. The access chamber 94 is cylindrical in shape and is divided vertically, by an intermediate lock 98, into an upper compartment 100 through which personnel move between the interior of the satellite station 14 and the submersible vehicle 38 and a lower compartment 102 through which a diver 103 enters and leaves the satellite station 14. Since the satellite station 14 would normally be maintained at atmospheric pressure, sealable hatches 104 and 107 are necessary at the lower and intermediate locks 96 and 98, respectively. An upper lock 105 is also sealed (by a nonillustrated hatch) when no submersible vehicle 38 is engaged thereto by a depending intermediate access tube 106. The submersible vehicle 38 also operates at atmospheric pressure normally, but an internal compartment therein, connected by the access tube 106 to the upper lock 105 of the satellite station 14, as well as the entire central access chamber 94, can be pressured up to accommodate divers who have worked in the open sea and require decompression. The divers in the pressurized compartment in the submersible vehicle 38 are transported to a surface ship where there are proper facilities for safe decompression.

All of the hydrocarbon products being produced through the satellite station 14 are confined to a processing chamber 108, at one end of the satellite shell 92, walled off by a bulkhead 110, to prevent contamination of the atmosphere in the remainder satellite station 14 if there should be a leak in the processing equipment. The air purification equipment 112, pumping equipment 114, and electrical power facilities 116 are in separate sealed compartments 118 to 122, respectively, of a control chamber 124 at the other end of the satellite station 14 from the hydrocarbon processing equipment. An operator 126, shown sitting at a control console 128 in the control chamber 124, can monitor and direct the equipment in the hydrocarbon chamber 108 as well as actuating valves at the wellhead units 10 and flowlines 18.

Both the upper and lower compartments 100, 102 of the access chamber 94 are normally closed to the sea and are held at atmospheric pressure. After the access tube 106, depending from under the submersible vehicle 38, makes contact with the lock 105 on the upper end of the satellite station 14, the two are sealably connected and any water in the access tube 106 is pumped out by equipment on the submersible vehicle 38. With an equalization of pressure, the hatch in the lock 105 is opened. Personnel can then enter the upper compartment 100 of the satellite station 14 directly from the submersible vehicle 38, through the access tube 106 at atmospheric conditions. Personnel from the submersible vehicle 38 come down rungs 130, fastened to the interior wall of the access chamber 94 to form a ladder, and enter the control chamber 124 through a safety airlock 131 and a ladder 133.

If the services of a diver are necessary, scuba or "hard hat" diving equipment, stored in the chamber 124, are utilized. Once the diving equipment is donned, the diver 103 enters the lower compartment 102, through a safety airlock 132, reseals the safety airlock 132 and makes sure the intermediate lock 142 is sealed, and then floods the lower compartment 102. As the lower compartment 102 fills with water, the diver 103 opens the lower lock 96 and descends into the water. If the job to be performed takes an extended time at depths of more than several hundred feet, the diver 103 may be limited to as short a working time as one-half hour before he must come back to the satellite station 14 to rest. In such a case, more than one diver 103 could be used, the remaining members of the working team resting in the atmospheric portions of the satellite station 14 while one of the team works in the water and each one exiting in turn through the lower lock 96 when the last one returns to the satellite station. In such a manner, work can continue over long periods of time although any one diver 103 cannot stay very long in the hostile environment.

When performing maintenance or inspection work in the processing chamber 108, the possibility of a gas leak in the equipment is checked by a workman donning life support gear such as scuba apparatus entering the chamber 108 with a hand-carried device for detecting toxic, pernicious gases that might be leaking from the processing equipment. Alternatively, a leak detector is mounted in the bulkhead 110 to sample the atmosphere within the compartment 108 while providing a visual indication to one either within the access chamber 94 or the control chamber 124. If possible the leak is stopped by shutting off the processing equipment from within the control chamber 124. The processing chamber 108 is then flooded while exhausting the contaminated atmosphere to the surrounding water. After re-establishing atmospheric conditions in the processing chamber 108, the atmosphere within the processing chamber is again checked, and if it is safe a workman can enter to make repairs. If the leak cannot be stopped in this manner, it will be necessary for a workman, wearing life support gear, to enter the contaminated processing chamber 108 to manually stop the leak. In the event that gas is escaping into the processing chamber 108 at a high pressure, too high a pressure for a man to exhaust through his breathing equipment into the processing chamber 108, an exhaust tube (not shown) would be connected from the life support gear back into the control chamber 124.

It is important to contain the contaminated atmosphere in the processing and access chambers 108, 94. By sealing the safety airlock 132 and the intermediate lock 98 from within the access chamber 94 before opening a safety lock 134, interconnecting the access chamber 94 within the processing chamber 108, the noxious fumes can be contained in the lower compartment 102 of the access chamber 94 and the processing chamber 108. After the maintenance or repair work is completed, the contaminated atmosphere within the processing chamber 108 and the access chamber 94 can be purged, by several alternate procedures. One way is to let in water under full pressure to displace the contaminated air through a line 136 by a hand-actuated control valve 138 in the lower compartment 102. The contaminated air in the lower compartment 102 of the access chamber 94 and the processing chamber 108 would then be forced out through a line 140 controlled by hand-actuated valve 142 also in the lower compartment 102. After the compartment 102 and the processing chamber 108 have been purged of the contaminated atmosphere therein by sea water, the valve 142 is closed and the sea water is pumped out through line 136 while air under atmospheric pressure is introduced. The water can also be expelled, through the line 136 without directly pumping it out by fresh air that is pumped in under pressure from the control chamber 124. Once all of the water has been expelled and the air pressure in the lower compartment 102 is brought back to atmospheric, the safety airlock 132 is reopened to allow the workmen to re-enter the control chamber 124. There would normally be no decompression problems associated with forcing out the contaminated air with ambient pressure sea water as long as the high pressure was not held for more than a few minutes.

Whenever a man is exposed to high pressures, even for a short time, there is some risk. So, for maximum safety, it is preferred that the contaminated air be evacuated into the surrounding water through the line 140 with the help of a pump (not shown) in the line. The water would be again brought in through the line 136. A pressure regulator (not shown) should be included in the line 136 to prevent the water pressure inside the satellite shell 92 from rising much above atmospheric. After all of the contaminated atmosphere has been displaced, the water is pumped out as described above while air under atmospheric pressure is reintroduced. At this time the equipment is rechecked for leaks.

In the instance where there was a very high pressure leak into the chamber 108, it would be dangerous for a man even to enter the chamber 108 with any portion of his body uncovered since the contaminated atmosphere therein could dissolve human skin. In fact, a gas such as methane would pass right through flesh, into the body fluids, altering the body chemistry and killing the man exposed to these conditions. Workmen would either have to wear completely protective clothing or the chamber 108 would have to be flooded prior to being entered and the workman would then preferably work in the chamber 108 under water. Very few materials possess the ability to withstand the onslaught of the high pressure gas and yet have the flexibility necessary for a protective garment. If the leak can be remotely stopped the diver would work under water at atmospheric pressure. If it is not possible to stop the leak prior to the workman entering the processing chamber 108 the diver-workman must work at ambient water pressure.

If the diver-workman must work for a considerable time at ambient pressure, he must be transported to a decompression chamber on an attending surface vessel (not shown) after the repairs are completed. After the repairs are completed in the flooded processing chamber 108, the workman enters the compartment 102, seals the safety lock 134, and has the water therein pumped out. A breathable atmosphere is pumped into the compartment 102 at ambient pressure. This can be done easily by opening the valve 138, or port 96, while pumping high pressure air into the lower compartment 102 to drive the water out. The upper compartment 100 is also pressurized. When all the water is evacuated from the lower compartment 102, the valve 138 or port 96, whichever was opened, is closed and the intermediate lock 98 is opened. The workman can now enter the pressurized compartment in the submersible vehicle 38 for transportation to the decompression chamber on the surface vessel without passing through an area of low pressure. Before a second repairman can enter the processing chamber 108 to check on the repair work, the pressure in the upper and lower compartments 100, 102 must be pumped down to atmospheric while the water in the chamber 108 is pumped out and replaced with air at atmospheric pressure so that leaks can be checked for at atmospheric conditions.

The flowlines 18, extending into the satellite station 14 at the end at which the processing chamber 108 is located, are each operatively connected by two-position three-way valves 144 to either a group manifold 146 or a test manifold 148. In turn, each one of the flowlines 18 is separately connected to the test manifold 148 while the remainder are connected to the group manifold 146. From the group manifold 146 the effluent, flowing through all but one of the lines 18, is conducted, through a main conduit 150, to a main outlet line 152 which in turn depends through the shell 92 of the satellite station 14 and extends across the marine bottom 12 to the pumping station in the satellite station 14 and therethrough to the floating storage tank 20. The effluent, from a single flowline 18 at a time, is directed into the test manifold 148 and therethrough into a test separator 154, through an inlet line 156. The separated-out gas leaves the separator 154 through an outlet line 158 and is injected back into the main effluent stream at the main outlet line 152. A meter 160 in the gas outlet line 158 provides a means for indicating the amount of gas flowing through the line 158. Also in the outlet line 158 is a manual shut-off valve 162 and an automatic valve 164 which is controlled by equipment from within the control chamber 124 of the satellite station 14 for increasing or decreasing the back pressure on the separator 154. An oil outlet line 166 also extends from the test separator 154 to the main outlet line 152. The oil outlet line 166 also has a meter 168, a manual shut-off valve 170, and an automatic valve 172. A dump line 174 is either connected directly between the sump of the separator 154 and the water outside the satellite station 14, for ridding the effluent of water separated out in the separator 154, or if the pressure in the separator is too low this waste liquid may have to be pumped out. Line 174 also includes a meter 176, a manual shut-off valve 178, and an automatic valve 180. An automatic satellite gathering and test system, of the type discussed above, has been explained in detail in the A. E. Barroll et al. Pat. No. 3,095,889, issued July 2, 1963.

Figure 3:
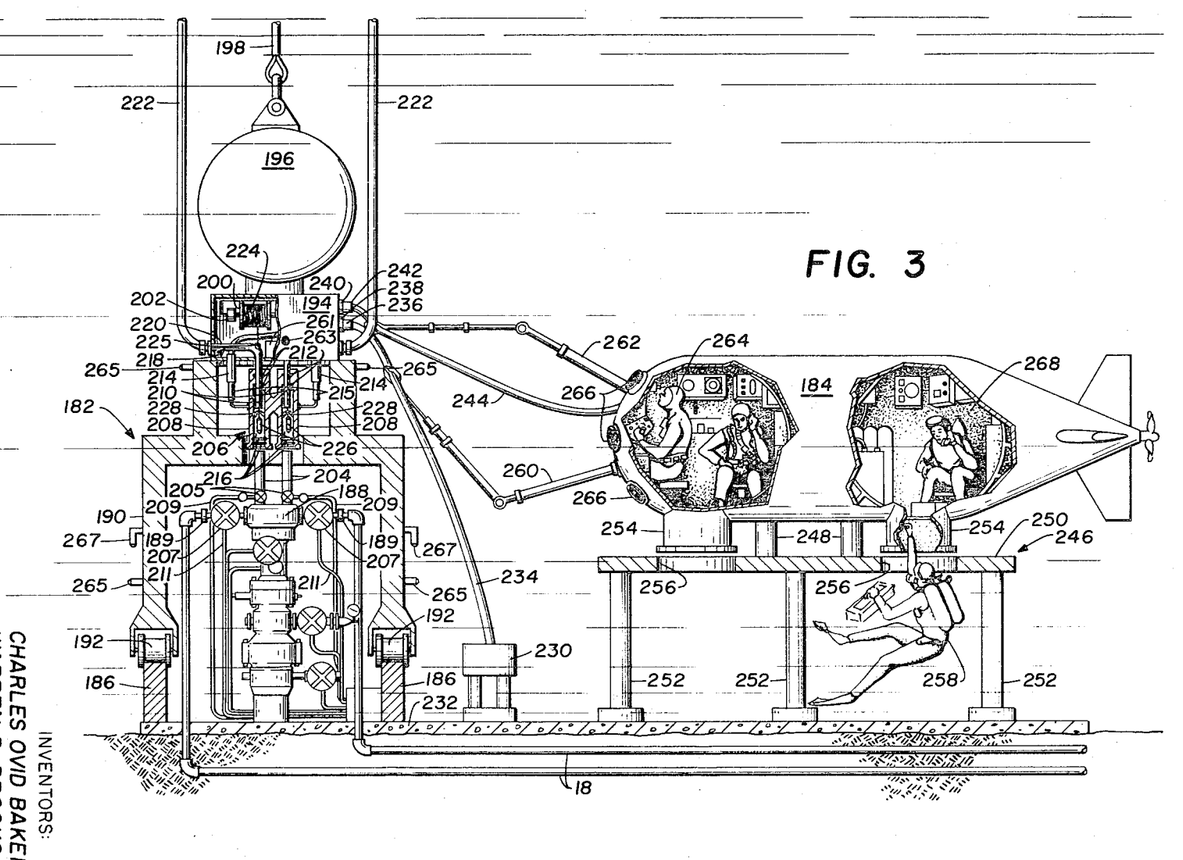
FIG. 3 is an elevational view, partially in cross section, and partially broken away, of a remotely controlled wireline robot unit, lowered by a surface vessel and controlled from a nearby submersible vehicle.

In FIG. 3 there is illustrated a semiautomatic robot wireline unit, generally designated 182, acting in conjunction with a surface vessel or support ship and specialized submersible vehicle 184, for providing a combination of remotely controlled and diver repair-maintenance services at the wellhead units 10 including completion and workover operations. The wireline unit 182 has rollers 192 affixed to the lower end thereof for seating on a pair of parallel tracks extending out to the side from each of the submerged wellheads 188 of the wellhead units 10 (FIGS. 1 and 3). The robot wireline unit 182, lowered from one of the surface support ships, is set down on the pair of parallel tracks 186. The robot wireline unit 182 rolls down the track 186 and over the wellhead 188 at which time it comes to rest against a pair of stops (not shown) at the lower ends of the pair of tracks 186, centered over a wellhead 188. The flowlines 18 extending from the illustrative wellhead are connected to a satellite station (not shown in this view). The flowlines have been installed as previously discussed by first attaching flowline sections to the fixed unit with collet connectors 189 located outward of the production valves 207.

The robot wireline unit 182 comprises an open lower frame 190 above which is centrally fixed a sealed compartment 194 containing the wireline apparatus. The lower end of a hoisting cable 198 is connected to the upper end of a buoyancy tank 196, secured to the upper end of the compartment 194 for at least partially supporting the weight of the unit 182 in the water while the robot unit 182 is being lowered or raised between the surface ship and the wellhead unit 10. The sealed compartment 194 contains wireline drums 200 (one shown) and electric motors 202 (also only one shown) for operating them. Supported beneath the compartment 194, in a withdrawn position just above upstanding lubricators 204 of the wellhead 188 of a dually completed well, as shown in FIG. 3, is a wireline tool storage and connector device, generally designated 206. The device 206 comprises a pair of relatively fixed parallel storage tubes 208 slidably mounted over parallel sections of tubing 210 depending from through the bottom of the upper sealed compartment 194. The parallel storage tubes 208 are slidably sealed to the tubing sections 210 by O-rings 212 fitted therewithin and coacting with the outer walls of the tubing sections 210. The tool storage and connector device 206 is designed to telescope down over the upstanding lubricators 204 being controlled by a pair of spaced hydraulic piston-cylinders 214, extending down through the bottom of the sealed compartment 194, the piston portions 215 being attached at their lower ends to opposite sides of the device 206. O-rings 216, fitted within the lower open ends of the parallel storage tubes 208, are adapted to seal slidably the parallel storage tubes 208 over the lubricators 204 to form unobstructed throughbores. The depending tubing sections 210 are each a portion of a rigid angled conduit, generally designated 218 (only one completely shown), extending completely through the compartment 194. Horizontal tubing sections 220 of the conduits 218 intersect the opposing side walls of the compartment 194 and connect up with the respective depending sections 210 through 90° bends. The outer end of each of the horizontal tubing sections 220 is connected to the lower end of a flexible line 222 extending upward to the surface vessel and to the source of stored treating fluid; thus, fluid paths are formed which extend from the surface vessel into the lubricators 204 of the wellheads 188. A wireline 224 wound on each drum 200 is threaded into the respective depending tubing section 210 through a vertical nipple 225, located at the 90° bend, which provides a slidable pressure seal for the wireline 224. The free ends of each of the wirelines 224, inside of the respective storage tubes 208, terminate in a wireline tool 226 hanging therein in the retracted position, and limited in its upward movement by a perforated domed cap 228 fixed in each of the storage tubes 208 above the respective tool 226. This arrangement not only allows the wireline tools 226 to be guided down into the upper ends of lubricators 204 but also allows treating fluids to be simultaneously pumped down through the flexible lines 222 from the surface vessel. Auxiliary fluids are necessary when performing operations such as cutting paraffin, where a solvent is usually injected in conjunction with the action of the scraping tool. Furthermore, the fluid pressure in the storage tubes 208, when they are telescoped over the lubricators 204, can be used for opening lubricator valves 205 and shutting the production valves 207 as taught in the G. D. Johnson Pat. No. 3,242,991, entitled "Underwater Wellhead with Re-entry Lubricator," and issued on Mar. 29, 1966. The valves 205 and 207 are alternatively controlled from the respective satellite station 14, 16 through interconnecting control lines 209 and 211, respectively. Each of the valves on the wellhead 188 has an auxiliary manual actuator (not shown) similar to the actuator 44 illustrated in FIG. 1.

If the fluids to be injetced into the subaqueous well are not too corrosive, the angled conduits and the nipples 225 can be dispensed with, only the vertical tubing sections being necessary. The fluid would then be pumped directly into the interior of the sealed compartment 194 filling the compartment, and exiting through the vertical tubes 210. The wireline drums 200 would be immersed in the fluid being injected into the subaqueous well.

The robot wireline unit 182 may be controlled from the surface support ship, in which case a viewing system would be installed on the robot unit 182 (not shown), or in an adjacent unmanned submersible vehicle, or directions could be relayed from an adjacent manned submersible vehicle. Where the operations are to be controlled from the support ship, the power necessary for winding the wirelines 224 on the respective drums 200, as well as for actuating the hydraulic piston cylinders 214, may be supplied by flexible electric lines extending to the accompanying ship. However, it is considered preferable to have the robot unit 182 obtain its electrical power from a subset power distribution network having its point of origin at the satellite station 14, rather than there being another line extending from the surface vessel. A waterproof electrical junction box 230 is fixed on a concrete base 232, which supports the various elements of the wellhead unit 10, adjacent the wellhead 188, and has a spring-loaded flexible extensible cable 234 that can be drawn out of the junction box 230 far enough so that a plug 236 on the free end thereof can be inserted into a mating connector 238, in one face of the wireline compartment 194. A second connector 240, in the same face of the compartment 194, is adapted to receive an electrical plug 242 on the free end of a flexible control cable 244 for controlling the operations of the robot wireline unit 182. Again the flexible control cable 244 could extend to the surface vessel, but it is preferable, as illustrated here, that the control cable 244 originate at the adjacent submersible vessel 184 resting on a docking platform, generally designated 246, anchored in the concrete base 232 and forming part of the wellhead unit 10. When not in use, the cable is stored in a retracted position in a receptacle or pocket in the outer hull of the submersible vehicle. The means for storing the cable 244 in the hull can be a spring-biased reel (not shown) upon which the cable 244 is wound. By pulling on the free end, the cable 244 is extended toward the wellhead unit 182. The submersible vehicle 184 has a pair of electromagnetic anchors (not shown) located within the lower hull thereof which can be energized to lock the submersible vehicle 184 in a pair of spaced iron cradles 248 fixed on the table top 250 of the docking platform 246. The table top 250 is supported above the concrete base 232 on spaced legs 252 to permit a diver 258 to leave the submersible vehicle 184 through lower locks 254 thereof which register with holes 256 in the table top 250 when the submersible vehicle is anchored in place.

The extensible cables 234 and 244 can be drawn out of their receptacles and plugged into the stationary connectors 238 and 240, respectively, by the use of articulated manipulators 260, 262 mounted in the front of the submersible vehicle 184 so that the operation may be observed by a wireline operator 264 in the submersible vehicle 184 through port holes 266 while the robot wireline unit 182 completes a programmed operation directed from the submersible vehicle 184 or the operator can personally control the operation through panel 265. The specific circuitry for manually or automatically operating the robot wireline unit 182 from a remote point such as the submersible vehicle 184 is old in the art and will not be discussed herein in detail. The lubricator valves 205 as well as the production valves 207 can be controlled from the submersible vehicle 184. The control of the production valves 207 from the submersible vehicle 184 would override the normally automatic control of these valves 207 from the respective satellite station 14 or 16. This control function would require the control signal to be transmitted through the control cable 244 to the robot unit 182, from the robot unit 182 through the power cable 234 to the respective satellite station, and from the satellite station back out to the proper wellhead unit. A less complicated method of controlling the lubricator valves 205 and the producing valves 207 would be by mechanical actuation through articulated manipulators 260 or 262. Another situation is that in which the subaqueous well has been shut in automatically in response to test results from the satellite station 14 indicating that a workover was necessary. In this case only the lubricator valve must be actuated. Both of the articulated manipulators 260, 262 can be used to perform operations at the wellhead unit 10, the reaction tool 46 (of FIGS. 1 and 2) not being needed due to the positive anchoring of the submersible vehicle 184.

It is desirable not to have to rely on surface vessels remaining above the subsea system to transport the robot wireline unit 182 between each of the wellhead units 10. It would be better, particularly in areas where rough seas are prevalent, to be able to move the robot unit 182 between the various wellhead units 10 with the help of a submersible vehicle, and use the support ship only for lowering the robot unit 182 from the surface to the first wellhead unit 10 to be worked over and raising the robot unit back up to the ship from the last wellhead unit 10 worked over. The near neutral bouyancy of the robot wireline unit 182, due to the buoyancy tank 196, would allow the robot unit 182 to be moved around beneath the surface with little effort. This movement can be accomplished by a jetting system incorporated within the robot wireline unit 182 and controlled from the submersible vehicle 184 through the interconnecting control line 244. The jetting system can, for example, comprise a jetting pump 261, in the sealed compartment 194, having an inlet port 263 extending through a wall of the sealed compartment 194 to pick up sea water to be used as the jetting agent. A valving arrangement in the pump 261 would permit water under pressure to be ejected through jetting nozzles affixed to the frame 190 of the robot wireline unit 182 under the control of the submersible vehicle 184. Exemplary, horizontally oriented jetting nozzles 265, vertically downwardly oriented jetting nozzles 267, connected with the pump 261, through internal passages (not shown) in the frame 190 of the robot wireline unit 182, permit the robot wireline unit 182 to be lifted from one wellhead unit 10, steered toward another wellhead unit 10, and landed on the rails 186 of the second wellhead unit 10, under the direction of the operator 264 in the submersible vehicle 184 which is moved alongside. The jetting system, under the control of the operator 264 in the submersible vehicle 184, can also be utilized to perform the final locating of the robot wireline unit 182 over the rails 186 of the first wellhead unit 10 when the robot wireline unit 182 is first lowered from the support ship.

If the support ship is not to remain over the subsea system during the operation of the robot wireline unit 182, provision must be made for supplying treating fluids to the robot wireline unit 182 when such treating fluids are necessary in the operation being performed. This can be accomplished by locating bottom storage tanks (not shown) at each wellhead unit 10 or group of wellhead units 10. The flexible upper ends of the flexible lines 222 can be lowered from the support ship and connected to these tanks. A submersible pump in each tank can pump out the treating fluid as necessary. The submersible pump would be powered through the subsea power distribution network previously discussed. The free ends of the flexible lines would be connected to the bottom storage tank, and the pump therewithin would be actuated from one of the submersible vehicles 32, 38 or 184 capable of performing such functions.

If some difficulty is encountered that cannot be corrected by the robot wireline unit 182 or by one of the multitooled articulated manipulators 260, 262 of the submersible vehicle 184, the workman-diver 258 emerges from the pressurized after-compartment 268 of the submersible vehicle 184 to make the necessary adjustments. As discussed with respect to the submersible vehicle 38, illustrated as servicing the satellite 14 in FIG. 2, the after-compartment is sealed after the diver 258 returns. The diver 258 is then taken to the attending surface vessel where he is transferred to a decompression chamber. The after-compartment 268 is kept at atmospheric pressure unless the divers 258 are needed. At that time the pressure is raised in the compartment 268 by the addition of helium to balance the water pressure. Thus, decompression would not be necessary unless the services of the divers 258 had actually been needed.

The power generating station 26, previously mentioned (shown in FIG. 1), has large diesel engines, turbines, or any other convenient type of prime mover for driving electrical generators to provide the power necessary to operate the subsea equipment. The power is transmitted to the producing system through a cable forming a part of the bundle 28 extending between the surface generating station 26 and the satellite station 14. From the satellite station 14 the electrical power is distributed to the satellite station 16 and the other satellite stations 14 (not shown) which are necessarily spaced across the marine bottom 12. From each satellite station 14 and 16 the distribution lines then extend to each piece of subsea equipment at which electrical power is needed, including each of the wellhead units 10 being controlled, providing power for operating the valves of the wellheads 188 as well as for operating auxiliary equipment such as robot wireline unit 182.

Figure 4:
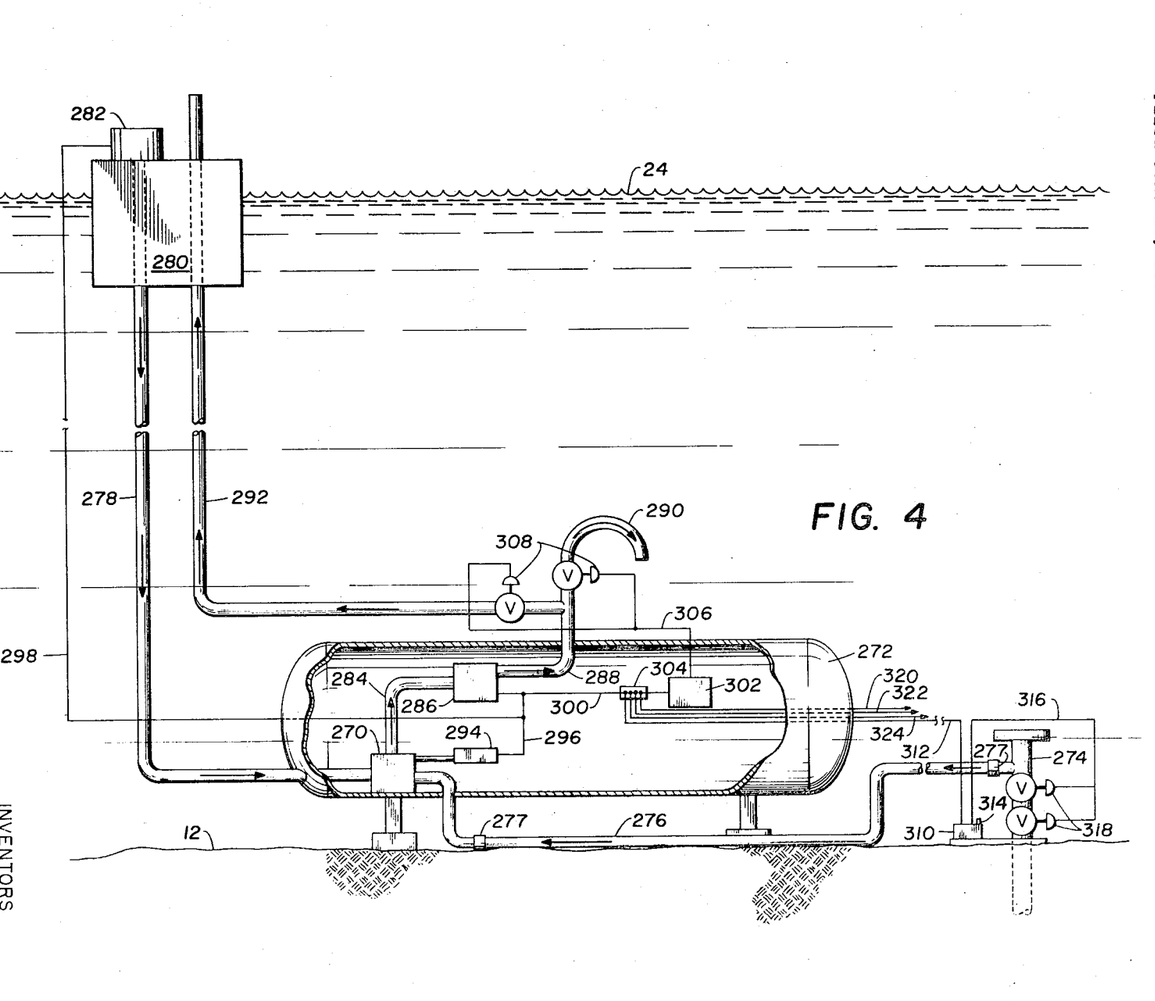
FIG. 4 is a schematic representation of a submerged, bottom-supported, power generating station.

For the protection of the generating station, this tool is preferably located on the marine bottom 12. Such an arrangement is shown in FIG. 4 where a prime power source, indicated at 270, is enclosed in a pressure resistant shell 272. The fuel for the prime power source 270 can be natural gas or a refined gasoline stored in a bottom-mounted tank, particularly if the power source 270 is an internal combustion engine or a gas turbine. When natural gas or low gravity petroleum is being produced in the subsea system, this is preferably taken directly from a subaqueous well and used as fuel. When a steam engine is the prime power source, any petroleum products produced, which will flow, can be burned to provide power. As illustrated, the fuel is directed into the bottom-mounted shell 272 from one respective submerged wellhead 274 through an interconnecting flowline 276 laying on the marine bottom 12 and connected to the two fixed units by collet connectors 277. All of the production of the well may be used as fuel or, if the production capacity of the well is large, only a small portion of the production fluid is directed to the generating station, the remainder being fed directly into a flowline between the wellhead 274 and a satellite station 14, 16. The fresh air necessary for combustion is supplied through a flexible conduit 278 connected between the interior of the shell 272 and a small floating buoy 280. A compressor or blower 282 is mounted on the buoy 280 for insuring a large enough volume of air. The products of combustion from the power source 270 are directed through a line 284 into a compressor or pump 286 from which they are driven, via line 288 to discharge, either into the sea through conduit 290 or to the atmosphere through a flexible conduit 292 extending from the line 288 to the floating buoy 280. The prime source, or engine, 270 drives an electrical generator 294 within the shell 272. The resulting electrical power is transmitted directly to the pump 286 through the main electrical line 296 and to the blower 282 through the lines 296 and 298. Electrical power is transmitted, by line 300, from the main line 296 to a transformer station 302 in the shell 272 through a terminal board 304. A line 306 transmits low voltage power from the transformer station 302 to the valves 308 controlling the flow of combustion products. Power is transmitted to a junction box 310 from the terminal board 304 through the interconnecting line 312. Low voltage power is obtained at the junction box 310 by transformers therewithin. A watertight electrical connector 314 on the junction box 310 provides power for auxiliary equipment, as discussed with respect to the robot wireline unit 182. A low voltage line 316 transmits power from the junction box 310 to the wellhead valves 318 for controlling the rate of delivery of fuel from the well. Other power lines 320–324, for example, transmit electrical power from the main terminal box 304 to the various wellhead units 10, satellite station 16, and other satellite stations 14. Although electrical power can be directly supplied to the individual wellhead units 10, it is preferable to have the main power lines from the main terminal box 304 connect to terminal boxes (not shown) within each satellite station 14, 16 and have the electrical power distributed therefrom to the respective wellhead units 10.

The floating storage tank 20 has a rigid transportation pipe 326 depending to a point just above the marine bottom 12 and terminating in a funnel 328, a flexible line 330 extending from the funnel 328 to the pumping section in the satellite station 16. A short section of the line 330, at the end of the line connected to the rigid transportation pipe 326 within the funnel, is of a weaker material or of the material as the rest of the line 330, but has a thinner wall. By this arrangement, if the floating storage tank 20 should break its moorings and float away, the interconnecting transportation path would tend to rupture, at its weakest point, in the flexible line 330 within the funnel 328. This would permit most of the fluid products to be saved and only the small amount in the flexible line 328 to be lost. The fluid products in the rigid pipe 326 would be driven up into the storage tank 20 by the hydrostatic pressure. A pressure actuated switch (not shown) is included in the flexible line 330 to shut off the pump in the satellite station 16 if the flexible line 328 were to rupture. Such a switch would be actuated by abnormally high or low pressure, depending on the water depth and the pump outlet pressure. It is also advisable to mount a pressure controlled switch in the outer end of the flexible line 330, just below the designed rupture portion to retain the fluid products in the flexible line 328. Furthermore, the storage tank 20 is moored as far to the side of the subsea field as possible so that if it should break loose, its mooring lines 332, extending to the marine bottom 12, would not snag in the subsea equipment.

Although the present invention has been described in connection with details of the specific embodiments thereof, it is to be understood that such details are not intended to limit the scope of the invention. Each of the described units of the subsea system previously discussed could conceivably be utilized without each and every one of the other units. For example, the satellite station 14 could be used without the particular robot wireline unit 182 or the robot welder 52. The terms and expressions employed are intended to be used in a descriptive sense only and there is no intention of excluding such equivalents in the invention described as fall within the scope of the claims. Now having described the subsea system herein disclosed, reference should be had to the claims which follow.

What is claimed is:

1. A satellite station to be located beneath the surface of a body of water, said satellite station comprising a hollow shell; means for dividing the interior of said shell into at least three airtight chambers; a first of said three chambers being an access chamber, providing an entrance from without said satellite shell to the second and third chambers; said second chamber being a processing chamber, means within said second chamber adapted to combine the produced fluid from a plurality of flowlines, each extending from a subaqueous well, and directing the combined flow of the produced fluids out of said satellite shell through a main outlet line; and means adapted to sequentially test the produced fluid flowing through each of said flowlines individually; and a third chamber being a control chamber, means within said third chamber for producing substantially atmospheric conditions, and means within said third chamber for the evaluation of the results of said testing in said processing chamber in response to test signals therefrom; and means adapted to control the respective subaqueous wells in response thereto, said processing and control chambers being interconnected only through said access chamber whereby personnel in said control chamber are protected from toxic gases originating in said processing chamber particularly when a leak in equipment in said processing chamber, permitting the escape of toxic gases, is being manually repaired.

2. The satellite station as recited in claim 1, wherein said hollow shell is generally cylindrical and is oriented with its axis of revolution parallel to the marine bottom, said first chamber being located in the central portion of said shell, completely separating said second and third chambers.

3. The satellite station as recited in claim 2, wherein there is a first entrance into said access chamber of said satellite station through the upper portion of said shell whereby access is provided directly to a lower hatch of a submersible vehicle; and a second entrance into said access chamber of said satellite station through the lower portion of said shell whereby a diver may directly enter the surrounding water.

4. The satellite station as recited in claim 3, wherein said access chamber is divided vertically into two compartments, an airtight lock between the upper and lower compartments, a first safety airlock between said lower compartment of said access chamber and said fluid processing chamber, a second safety airlock between said lower compartment of said access chamber and said control chamber, and a third safety airlock between said upper compartment of said access chamber and said control chamber whereby said processing chamber can be entered to make repairs through said lower compartment while personnel can enter said control chamber from a submersible vehicle, through said upper entrance, through said shell and said third safety airlock without said control chamber becoming contaminated from toxic gases from said processing chamber.

5. The satellite station as recited in claim 4, wherein said control chamber is maintained at substantially atmospheric pressure.

6. A subsea system for the production of fluid minerals from subaqueous deposits through wells having wellheads located beneath the surface of a body of water comprising: a plurality of underwater wellhead units, each of said wellhead units being equipped with at least one remotely actuatable valve for controlling the flow of produced fluid from the respective well; at least one production satellite station located beneath the surface of said body of water; said satellite station comprising a hollow shell; means for dividing the interior of said shell into at least three airtight chambers; a first of said three chambers being an access chamber providing an entrance from said body of water surrounding said satellite shell to said second and third chambers; said second chamber being a processing chamber; flowlines connecting each of said plurality of underwater wellhead units, through said respective remotely actuatable valves, with said processing chamber; means located in said processing chamber for combining the produced fluid from all of said wells flowing through said flowlines and directing said produced fluid through a main outlet line; means located in said processing chamber for selectively testing said produced fluid flowing through each of said flowlines individually; means within said third chamber for the evaluation of the results of said testing in said second chamber and for causing the actuation of said remotely actuatable wellhead valves in response to said results of the selective testing of said produced fluid flowing through said flowlines to optimize production; and means for producing a generally atmospheric condition within said third chamber, said processing and control chambers being interconnected only through said access chamber whereby personnel in said third chamber are protected from any toxic gases originating in said second chamber.

7. A subsea system for the production of fluid minerals as recited in claim 6 wherein there is a first entrance into said first chamber of said satellite station through the upper portion of said shell whereby access is provided to a lower hatch of a submersible vehicle tending the various, spaced subsea producing units; and a second entrance into said access chamber of said satellite station through the lower portion of said shell whereby a diver needed to perform manual repair and maintenance operations on said various, spaced subsea producing units may directly enter the surrounding water from said satellite station or though said satellite station from said submersible vehicle.

8. A fail-safe subsea system for the production of fluid minerals from subaqueous deposits through wells having wellheads located beneath the surface of a body of water comprising: a plurality of underwater wellhead units, each of said wellheads of said wellhead units being equipped with at least one remotely actuatable valve for controlling the flow of produced fluid from the respective well; at least one production satellite station located beneath the surface of said body of water; flowlines connecting each of said plurality of underwater wellheads, through the respective remotely actuatable wellhead valve, with the interior of said satellite station; means within said satellite station for combining the produced fluid from all of said wells flowing through said flowlines and directing said produced fluid through a main outlet line; means within said satellite station for selectively testing said produced fluid flowing through each of said flowlines individually; means for actuating said remotely actuatable wellhead valves in response to the results of the selective testing of the produced fluid flowing through said flowlines to optimize production; each of said remotely actuatable wellhead valves including a mechanical valve actuator to provide for actuation of said valves at the sites of each of said wellheads; fluid pump means connected between said main outlet line and a fluid transportation path extending to the surface, said pump means being capable of driving said produced fluid through said fluid transportation path to said surface of said body of water, and at least one submersible vehicle capable of independent movement in the body of water; an articulated manipulator extending outward of said submersible vehicle and affixed thereto; means at the outer end of said manipulator for coacting with said mechanical valve actuators of each of said wellhead valves for manually controlling said wellhead valves at the sites of said wellhead units.

9. In the fail-safe subsea production system of claim 8, means for operating said articulated manipulator by personnel within said submersible vehicle.

10. In the fail-safe subsea production system of claim 8, means for operating said articulated manipulator from a remote point spaced from said submersible vehicle; and means carried by said submersible vehicle for remotely viewing the area in which said articulated manipulator will operate whereby said submersible vehicle and the articulated manipulator thereof can be operated from a surface vessel.

11. The fail-safe subsea production system of claim 10 wherein there is a diver compartment within said submersible vehicle capable of being independently pressurized whereby repair and maintenance operations at each wellhead unit can be accomplished with combinations of manual and remote actuation in deep water, and a surface ship in attendance having a decompression chamber thereon whereby a diver, having worked in deep water, can be transported in a pressurized state in said diver compartment in said submersible vehicle to said decompression chamber whereby said diver can be decompressed on said surface ship while said submersible vehicle returns to work beneath the surface.

12. A subsea system for the production of fluid minerals from subaqueous deposits through wells having wellheads located beneath the surface of a body of water comprising: a plurality of underwater wellhead units, each of said wellheads of said wellhead units being equipped with at least one remotely actuatable valve for controlling the flow of produced fluid from the respective well; at least one production satellite station located beneath the surface of said body of water; flowlines connecting each of said plurality of underwater wellheads, through the respective remotely actuatable wellhead valve, with the interior of said satellite station; means within said satellite station for combining the produced fluid from all of said wells flowing through said flowlines and directing said produced fluid through a main outlet line; means within said satellite station for selectively testing said produced fluid flowing through each of said flowlines individually; means for actuating said remotely actuatable wellhead valves in response to the results of the selective testing of the produced fluid flowing through said flowlines to optimize production; fluid pump means connected between said main outlet line and a fluid transportation path extending to the surface, said pump means being capable of driving said produced fluid through said fluid transportation path to said surface of said body of water, a robot unit for performing operations within said subaqueous wells; means for operatively positioning said robot unit on each of said wellhead units; a wireline drum forming a portion of said robot; a motor within said robot unit for driving said wireline drum; means for powering said motor comprising electrical power lines extending from a central source of power along the marine bottom to each of said wellhead units; electrical connector means at each of said wellhead units; and corresponding electrical connector means associated with said robot unit for releasably connecting said robot unit with said source of power to rotate said wireline drum.

13. The subsea system of claim 12 wherein there is means for remotely controlling said robot unit.

14. The subsea system of claim 13 wherein said remote control means comprises a manned submersible vehicle; means for fixedly locating said submersible vehicle at each of said wellhead units; means within said submersible vehicle for controlling said robot unit; a control cable; means for releasably connecting said control cable between said robot unit and said means within said submersible vehicle for controlling said robot unit whereby when said cable is connected between said robot unit and said submersible vehicle, the operation of said robot unit can be controlled by personnel within said submersible vehicle.

15. The subsea system of claim 14 wherein said submersible vehicle is fitted with at least one articulated manipulator, a tool affixed to said manipulator for connecting said control cable between said robot unit and said submersible vehicle.

16. The subsea system of claim 13 wherein said cable is permanently attached to said submersible vehicle and is stored in a retracted condition substantially within the hull thereof, said cable having a first electrical connector means at the outer end thereof, and a matable second electrical connector means affixed on said robot unit whereby said first and second electrical connector means can be mated to permit operation of said robot unit from inside said submersible unit.

17. A subsea system for the production of fluid minerals from subaqueous deposits through wells having wellheads located beneath the surface of a body of water comprising: a plurality of underwater wellhead units, each of said wellheads of said wellhead units being equipped with at least one remotely actuatable valve for controlling the flow of produced fluid from the respective well; at least one production satellite station located beneath the surface of said body of water; flowlines connecting each of said plurality of underwater wellheads, through the respective actuable wellhead valve, with the interior of said satellite station; means within said satellite station for combining the produced fluid from all of said wells flowing through said flowlines and directing said produced fluid through a main outlet line; means within said satellite station for selectively testing said produced fluid flowing through each of said flowlines individually; means for actuating said remotely actuatable wellhead valves in response to the results of the selective testing of the produced fluid flowing through said flowlines to optimize production; fluid pump means connected between said main outlet line and a fluid transportation path extending to the surface, said pump means being capable of driving said produced fluid through said fluid transportation path to said surface of said body of water; a robot unit for performing operations within said subaqueous wells; means for operatively positioning said robot unit at each of said wellhead units; a wireline drum mounted in said robot; a motor within said robot unit for driving said wireline drum; means for powering and controlling said motor comprising electrical power lines extending from a remote point; an upstanding lubricator on said wellhead unit for entering said subaqueous well with a wireline; a valve means for selectively opening said lubricator; and means for selectively opening said lubricator valve means when said production valve has been closed and said robot unit is in position at said wellhead unit.

18. The subsea system of claim 17 wherein said robot unit is lowered to a wellhead unit by a cable from a surface vessel; a flexible conduit extending between a source of treating fluid on said surface vessel and said robot unit; and means for connecting said flexible conduit to an upstanding lubricator of the respective wellhead to form a closed fluid path while providing an unobstructed path into the lubricator for a wireline wound on and anchored to said wireline drum.

19. A subsea wireline unit for performing completion and/or workover operations through an underwater wellhead; support means having a sealed compartment as a part thereof; means for locating said unit with respect to an underwater wellhead; a rotatable wireline drum located in said sealed compartment; a wireline having one end anchored to said drum and having a free end adapted to be connected to a wireline tool; means in said sealed compartment for allowing said wireline to exit from said sealed compartment directly through the lower end of said compartment; and means in said sealed compartment for rotating said wireline drum whereby said wireline may be raised or lowered through said wellhead when said unit is in an operable position.

20. A subsea wireline unit adapted for performing completion and/or workover operations through an underwater wellhead having a lubricator thereon, comprising: a supporting frame; means for locating said frame with respect to the underwater wellhead; a rotatable wireline drum supported by said frame substantially over and adjacent the lubricator of the underwater wellhead; a wireline wound on said wireline drum, said wireline having one end anchored to said drum and having another end adapted to be connected to a wireline tool; means on said frame for rotating said wireline drum to raise and lower said wireline in a subaqueous well through the lubricator when said wireline unit is in an operable position; means for positioning said wireline unit when said unit is in a body of water; and means providing a fluid path from a source of fluid into the well when said wireline unit is in an operable position.

21. A subsea wireline unit for performing completion and/or workover operations through an underwater wellhead comprising: a supporting frame; means for locating said frame with respect to an underwater wellhead; a rotatable wireline drum supported by said frame substantially over and adjacent to the underwater wellhead when said unit is in an operable position at the wellhead; a wireline wound on said wireline drum with one end of said wireline affixed to said drum and being adaptable to be connected to a wireline tool at its free end; means on said frame for rotating said wireline drum whereby said wireline may be raised and lowered through the wellhead; and means on said frame for propelling said unit through a body of water for positioning said unit at the wellhead.

22. The wireline unit of claim 21 wherein said means for propelling said unit through a body of water includes:
means for propelling the unit in a relative horizontal direction; and
means for propelling the unit in a relative vertical direction.

23. The wireline unit of claim 21 wherein said means for propelling said unit through a body of water comprises: a plurality of jet nozzles affixed to said supporting frame; a source of fluid under pressure; and means for providing a fluid connection between selected of said plurality of jet nozzles and said source of fluid under pressure, said nozzles being oriented so that with the proper selection of nozzles to be fluidly connected to said source of fluid under pressure said wireline unit can be transported between a plurality of spaced wellheads and can be located over a lubricator of each of said wellheads.

24. A subsea robot wireline unit for performing completion and/or workover operations through an underwater wellhead comprising: a supporting frame; means for locating said frame with respect to an underwater wellhead; a rotatable wireline drum supported by said frame directly over and adjacent to the lubricator of a respective underwater wellhead; a wireline wound on said wireline drum with one end of said wireline anchored to said drum and having a wireline tool affixed to the free end of said wireline; remotely controlled means for rotating said wireline drum to lower said wireline tool into a subaqueous well through the lubricator and then withdrawing the tool from the subaqueous well; remotely controlled means for positioning said robot wireline unit in a body of water from a distant point; and means providing a fluid path from a source of treating fluid into the wellhead lubricator for injecting a fluid into the subaqueous well.

25. The subsea robot wireline unit as recited in claim 24 wherein there is means for positioning said robot wireline unit from a surface vessel.

26. The subsea robot wireline unit as recited in claim 24 wherein said means for providing a fluid path from a source of treating fluid into the wellhead lubricator includes an extensible section for adjustably connecting said fluid path means to the upper end of a lubricator of a wellhead after said wireline drum is located over a wellhead.

27. The subsea robot wireline unit as recited in claim 26 wherein there is means for housing said wireline tool, in a retracted position, at least within said extensible section of said fluid path means; said fluid path means and said wireline drum being so related that fluid can be injected into a subaqueous well from said source of treating fluid simultaneously with the operation of the wireline drum and the resultant traveling of the wireline tool through at least a portion of the length of the subaqueous well.

28. The subsea robot wireline unit as recited in claim 27 wherein said wireline drum is located within a sealed compartment; and said fluid path extends through said compartment.

29. The subsea robot wireline unit of claim 13 wherein said portion of said fluid path extending through said sealed compartment consists of a rigid conduit having a section of tubing with a continuous bend and vertical section of tubing; a vertical nipple extending through the wall of said conduit at said bend in said conduit; and the free end of a wireline wound on said drum slidably passing through said nipple and into said vertical section of tubing and forming a pressure seal with said nipple whereby a wireline tool fixed to the free end of said wireline can be lowered down or reeled up through the production tubing of said subsea well while fluid is being injected thereinto.

30. The subsea robot wireline unit of claim 29 wherein said extensible section of said fluid path comprises a storage tube slidably mounted over the lower end of said vertical section of tubing; means for providing a sliding seal between said storage tube and said vertical section of tubing; and means within the lower end of said storage tube for sealably connecting said storage tube to the upper end of an upstanding lubricator located on an underwater wellhead.

31. The subsea robot wireline unit of claim 30 adapted to be used with a plurally completed well having a wellhead with parallel production passages and spaced parallel upstanding lubricators wherein each of the production passages can be acted on without relocating said subsea robot wireline unit comprising: a plurality of wireline drums located in said robot unit so one wireline drum is above and adjacent each of the lubricators of the underwater wellhead when said robot wireline unit is operatively positioned with respect to the underwater wellhead; extensible means for connecting at least one fluid path, extending from a source of treating fluid to the underwater wellhead, to each of the production passages of the underwater wellhead simultaneously through the upstanding lubricators of the underwater wellhead.

32. The subsea robot wireline unit of claim 24 wherein there is means for positioning said robot wireline unit in said body of water, said positioning means comprisng: a plurality of jet nozzles affixed to said supporting frame; a source of fluid under pressure; and means for providing a fluid connection between selected of said plurality of jet nozzles and said source of fluid under pressure, said nozzles being oriented so that with the proper selection of nozzles to be fluidly connected to said source of fluid under pressure the robot wireline unit can be transported between a plurality of spaced wellheads and can be located over a lubricator of each of said wellheads.

33. The subsea robot wireline unit of claim 32 wherein said source of fluid under pressure is a pump affixed to said robot wireline unit, said pump receiving a supply of water from the surrounding body of water.

34. The subsea robot wireline unit of claim 32 wherein said means for positioning said robot wireline unit includes a submersible vehicle; and means for remotely controlling said source of fluid under pressure and the selection of those of said jetting nozzles fluidly connected to said source of fluid under pressure, from said submersible vehicle.

35. The subsea robot wireline unit of claim 34 wherein said means for controlling said source of fluid under pressure and said selection of those of said jetting nozzles fluidly connected to said source of fluid under pressure comprises a control cable; and means for releasably connecting said control cable between said robot wireline unit and said submersible vehicle whereby when said cable is connected between said robot wireline unit and said submersible vehicle, the operation of said robot wireline unit can be controlled by an operator within said submersible vehicle.

36. The subsea robot wireline unit of claim 35 wherein said remotely controlled means for rotating said wireline drum comprises said control cable.

37. A robot unit adapted to perform wireline operations on a well through at least one upstanding lubricator of a respective wellhead unit at a remote location comprising: an open frame; rollers rotatably affixed to the lower end of said open frame; and wireline apparatus mounted on the upper end of said frame whereby when said robot unit is lowered, onto rails fixed with respect to the respective wellhead, at a position spaced from the wellhead, said robot unit can be rolled along said rails into a position in which said wireline apparatus is directly over an upstanding lubricator of the respective wellhead and adjacent thereto.

38. A robot unit as recited in claim 37 wherein said wireline apparatus comprises a wireline drum; means for rotating said wireline drum; and means including a fluid path for injecting a treating fluid into a production passage of said well while running a wireline, wound on and anchored to said wireline drum, down into said production passage through said lubricator.

39. The robot unit of claim 38 wherein said wireline drum is rotatably mounted within a sealed compartment, said fluid path extending from a remote location through said sealed compartment, the free end of said wireline terminating in a wireline tool, passing into said fluid path within said sealed compartment so as to be able to travel through the production path of a well simultaneously with the injection of a fluid into the well.

40. A method for carrying out maintenance operations in a subsea satellite station having a processing chamber and a control chamber separated by an access chamber when said processing chamber contains toxic gases and contamination of said control chamber is to be prevented and wherein the contaminated atmosphere in said processing chamber would not be seriously injurious when in contact with the human body, including the following steps:
 (a) entering said processing chamber from said access chamber, while wearing personnel life support gear, subsequent to sealing said access chamber entrances through said shell and to said control chamber;
 (b) repairing said processing equipment including correcting all gaseous leaks;
 (c) flooding both said processing and access chambers while bleeding off the contaminated atmosphere into the surrounding water; and
 (d) re-establishing atmospheric conditions within said processing chamber and said access chamber.

41. The method as recited in claim 40, wherein said access chamber is vertically divided into upper and lower compartments having a safety airlock therebetween, there also being safety airlocks between said upper and lower compartments of said access chamber and said control chamber, wherein personnel must enter said control chamber during said maintenance operations in said processing chamber, including said following steps:
 (e) entering said upper compartment of said access chamber of said satellite station through said upper entrance while said airlock between said upper and lower compartments remains sealed; and
 (f) entering said control chamber of said satellite station through said safety airlock directly between said upper compartment and said control chamber.

42. A method for carrying out maintenance operations in a subsea satellite station having a processing chamber and a control chamber separated by an access chamber when said processing chamber contains toxic gases and the contamination of the atmosphere of said control chamber is to be prevented wherein the contaminated atmosphere in said processing chamber would be seriously injurious when in contact with the human body, including the following steps:
   (a) sealing said entrance between said access chamber and said control chamber with a workman equipped with personnel life support gear in said access chamber;
   (b) flooding both said processing and said access chambers while exhausting the contaminated atmosphere in the chambers being flooded into the surrounding water;
   (c) subsequent to step (b) entering said processing chamber from said access chamber;
   (d) repairing the leaks in the equipment in said processing chamber causing said contaminated atmosphere;
   (e) re-establishing atmospheric conditions within said processing chamber and said access chamber; and
   (f) testing the results of the maintenance operation under atmospheric conditions.

43. A method for carrying out maintenance operations in a processing chamber of a subsea satellite station as recited in claim 42 wherein said workman must be in said flooded processing chamber long enough to require decompression, including the following steps between steps (d) and (e):
   (g) establishing a breathable atmosphere at ambient pressure in said processing chamber and said access chamber; and
   (h) transferring said workman to a pressurized chamber in a submersible vehicle directly from said access chamber to a pressurized chamber in an attending submersible vehicle and from said submersible vehicle to a decompression chamber aboard a surface vessel.

References Cited

UNITED STATES PATENTS

| | | | |
|---|---|---|---|
| 3,063,507 | 11/1962 | O'Neill et al. | 175—8 |
| 3,099,318 | 7/1963 | Johnson | 166—.6 |
| 3,211,223 | 10/1965 | Hoch | 166—.6 |
| 3,292,695 | 12/1966 | Haeber | 166—.5 |
| 3,353,364 | 11/1967 | Blanding et al. | 166—.5 X |
| 3,366,173 | 1/1968 | McIntosh | 166—.5 |
| 3,381,485 | 5/1968 | Crooks et al. | 61—69 |
| 3,391,734 | 7/1968 | Townsend | 61—69 X |
| 3,401,746 | 9/1968 | Stevens et al. | 166—.5 |
| 3,415,317 | 12/1968 | Drivet | 166—.6 |

STEPHEN J. NOVOSAD, Primary Examiner

R. E. FAVREAU, Assistant Examiner

U.S. Cl. X.R.

175—77

PO-1050
(5/69)

UNITED STATES PATENT OFFICE
CERTIFICATE OF CORRECTION

Patent No. 3,520,358                    Dated   July 14, 1970

Inventor(s)  Warren B. Brooks, Charles Ovid Baker, Eugene G. Jones

It is certified that error appears in the above-identified patent and that said Letters Patent are hereby corrected as shown below:

Column 1, line 40, "which" should be deleted.

Column 3, line 21, "aqueaus" should be --aqueous--;
          line 26, "encapsuluating" should be --encapsulating--.

Column 4, line 72, "unloading" should be --onloading--.

Column 6, line 36, "holding" should be --hold--.

Column 12, line 38, "subset" should be --subsea--.

Column 13, line 27, "has" should be --had--;
           line 60, --and-- should be inserted after "265,".

Column 14, line 51, "tool" should be --too--.

Column 15, line 69, "of it," should be --of, it--.

Column 19, Claim 17, line 22, --remotely-- should be inserted after "respective"; and "actuable" should be --actuatable--

Column 21, Claim 29, line 15, "claim 13" should be --claim 28--;

Claim 32, line 54, "comprisng" should be --comprising--
                    line 55, "pluralty" should be --plurality--.

Column 24, References Cited (Per Paper No. 3), "3,099,318" should be --3,099,316--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents